(12) United States Patent
Wu et al.

(10) Patent No.: US 11,221,734 B2
(45) Date of Patent: Jan. 11, 2022

(54) PUNCH-HOLE SCREEN DISPLAY METHOD AND APPARATUS

(71) Applicant: BEIJING XIAOMI MOBILE SOFTWARE CO., LTD., Beijing (CN)

(72) Inventors: Tsang-chih Wu, Beijing (CN); Yung Chi Wen, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/858,363

(22) Filed: Apr. 24, 2020

(65) Prior Publication Data

US 2021/0132772 A1    May 6, 2021

(30) Foreign Application Priority Data

Oct. 30, 2019   (CN) .......................... 201911042773.5

(51) Int. Cl.
| | |
|---|---|
| *G06F 3/048* | (2013.01) |
| *G06F 3/0481* | (2013.01) |
| *G06F 1/16* | (2006.01) |
| *G06F 3/0488* | (2013.01) |
| *G09G 3/20* | (2006.01) |

(52) U.S. Cl.
CPC ........ *G06F 3/04817* (2013.01); *G06F 1/1605* (2013.01); *G06F 1/1626* (2013.01); *G06F 3/04886* (2013.01); *G09G 3/20* (2013.01); *G09G 2340/0464* (2013.01); *G09G 2354/00* (2013.01); *G09G 2360/141* (2013.01)

(58) Field of Classification Search
CPC ....... G06F 3/03547; G06F 3/041–0436; G06F 3/03817; G06F 3/04886; G06F 1/1605; G09G 3/20; G09G 2340/0464; G09G 2354/00; G09G 2360/141
See application file for complete search history.

(56) References Cited

U.S. PATENT DOCUMENTS

| | | | |
|---|---|---|---|
| 2010/0235732 A1* | 9/2010 | Bergman | G06F 3/0488 715/702 |
| 2013/0135328 A1 | 5/2013 | Rappoport et al. | |
| 2014/0289668 A1* | 9/2014 | Mavrody | G06F 1/1643 715/781 |

(Continued)

FOREIGN PATENT DOCUMENTS

CN    108845854 A    11/2018

OTHER PUBLICATIONS

Extended European Search Report issued to EP Application No. 20175231.8 dated Aug. 26, 2020, (12p).

*Primary Examiner* — Roy P Rabindranath
(74) *Attorney, Agent, or Firm* — Arch & Lake LLP (57) ABSTRACT

Provided is a punch-hole screen display method and a terminal. The punch-hole screen comprises a display area and at least two hole-regions disposed in the display area for light to enter. The method comprises: acquiring, by the terminal, a display mode switching instruction; determining a display mode of the punch-hole screen based on the display mode switching instruction, the display mode defines a target screen area and a display manner of the target screen area in a bright screen state, and the target screen area is a display zone associated with the hole-regions in the display area; and displaying the target screen area in the display manner.

20 Claims, 8 Drawing Sheets

(56) References Cited

U.S. PATENT DOCUMENTS

2017/0351397 A1\* 12/2017 Won ..................... G06F 3/0488
2018/0348881 A1\* 12/2018 Chung ................ G06F 3/04883
2019/0130822 A1    5/2019 Jung et al.
2019/0188445 A1\*  6/2019 Chi ........................ H01H 13/14

\* cited by examiner

PUNCH-HOLE SCREEN DISPLAY METHOD AND APPARATUS

CROSS-REFERENCE TO RELATED APPLICATIONS

This application is based upon and claims priority to Chinese Patent Application No. CN 201911042773.5, filed on Oct. 30, 2019, the entire contents of which are incorporated herein by reference.

TECHNICAL FIELD

The present disclosure relates to the field of computer communication technology, and more particularly, to a punch-hole screen display method and apparatus.

BACKGROUND

The punch-hole screen punches holes in the complete display screen, and the front camera assembly is installed in the holes. Compared with a water-drop screen, the punch-hole screen has a larger screen-to-body ratio. How to control the display of the punch-hole screen to improve the user experience is a problem to be solved.

SUMMARY

According to a first aspect of the present disclosure, there is provided a punch-hole screen display method. The punch-hole screen includes a display area and at least two hole-regions disposed in the display area for light to enter, the method includes: acquiring a display mode switching instruction; determining a display mode of the punch-hole screen based on the display mode switching instruction, the display mode defines a target screen area and a display manner of the target screen area in a bright screen state, and the target screen area is a display zone associated with the hole-regions in the display area; and displaying the target screen area in the display manner.

According to a second aspect of the present disclosure, there is provided a terminal for displaying a punch-hole screen. The punch-hole screen includes a display area and at least two hole-regions disposed in the display area for light to enter. The terminal includes one or more processors; and a non-transitory storage coupled to the one or more processors; and a plurality of programs stored in the non-transitory storage that, when executed by the one or more processors, cause the terminal to: acquire a display mode switching instruction; determine a display mode of the punch-hole screen based on the display mode switching instruction, the display mode defines a target screen area and a display manner of the target screen area in a bright screen state, and the target screen area is a display zone associated with the hole-regions in the display area; and display the target screen area in the display manner.

According to a third aspect of the present disclosure, there is provided a non-transitory computer readable medium storing a plurality of programs for execution by a terminal having one or more processors, wherein the plurality of programs, when executed by the one or more processors, cause the terminal to perform acts comprising: acquiring a display mode switching instruction; determining a display mode of the punch-hole screen based on the display mode switching instruction, the display mode defines a target screen area and a display manner of the target screen area in a bright screen state, and the target screen area is a display zone associated with the hole-regions in the display area; and displaying the target screen area in the display manner.

It should be understood that the above general description and the following detailed description are merely exemplary and explanatory, and should not limit the present disclosure.

DETAILED DESCRIPTION

Embodiments will be described in detail herein, examples of which are illustrated in the accompanying drawings. When the following description refers to the accompanying drawings, the same numbers in different drawings represent the same or similar elements unless otherwise indicated. The implementations described in the following embodiments do not represent all implementations consistent with the present disclosure. Rather, they are merely examples of devices and methods consistent with some aspects of the present disclosure, as detailed in the appended claims.

The terminology used in this disclosure is for the purpose of describing particular embodiments only and is not intended to limit the disclosure. As used in this disclosure and the appended claims, the singular forms "a", "an" and "the" are intended to include the plural forms as well, unless the context clearly indicates otherwise. It should also be understood that the term "and/or" as used herein refers to and includes any or all possible combinations of one or more of the associated listed items.

It should be understood that, although the terms first, second, third, etc. may be used in this disclosure to describe various information, such information should not be limited to these terms. These terms are only used to distinguish the same type of information from each other. For example, without departing from the scope of the present disclosure, the first information may also be referred to as the second information, and similarly, the second information may also be referred to as the first information. Depending on the context, the word "if" as used herein can be interpreted as "at" or "when" or "in response to determination".

The present disclosure provides a punch-hole screen display method, which is applied to a terminal. The punch-hole screen is installed in the terminal. The punch-hole screen includes a display area and at least two hole-regions disposed in the display area for light to enter. The terminal may be a mobile phone, a tablet computer, a personal digital assistant, and the like.

The number of hole-regions on the punch-hole screen can be set as required, for example, two, three, four, and so on. When the punch-hole screen is provided with two hole-regions, the terminal can be set with two front cameras.

Figure 1:
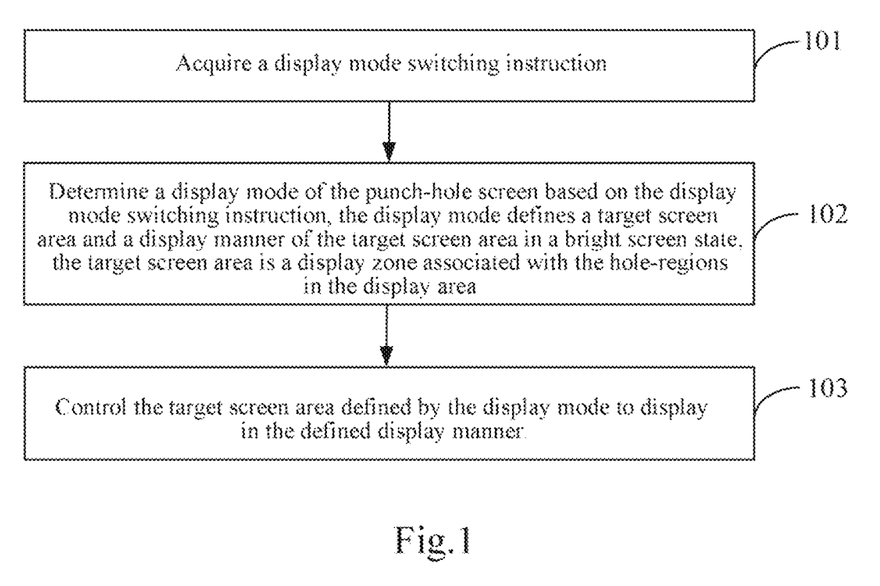
FIG. 1 is a flow chart showing a punch-hole screen display method according to an embodiment.

FIG. 1 is a flow chart showing a punch-hole screen display method according to an embodiment. The method shown in FIG. 1 is applied to a terminal installed with a punch-hole screen. The punch-hole screen includes a display area and at least two hole-regions disposed in the display area for light to enter. The punch-hole screen display method shown in FIG. 1 includes the following steps:

In step 101, a display mode switching instruction is acquired.

A display mode defines a target screen area and a display manner of the target screen area in the bright screen state. The target screen area is a display zone associated with the hole-regions in the display area. The target screen area may be a small area screen zone surrounding around the hole-region. It can also include the entire screen.

The terminal is provided with various kinds of display modes, and various kinds of display modes can be used in a switching way.

There are many ways for a terminal to acquire a display mode switching instruction. For example, a display mode switching instruction is generated based on a display mode switching operation performed by a user on a system setting interface; or a display mode switching instruction is generated based on a user's screen sliding operation; or a display mode switching instruction is generated based on a input voice message; or a display mode switching instruction is generated based on a user's pressing operation to a physical key on the terminal.

In step 102, a display mode of the punch-hole screen is determined based on the display mode switching instruction. The display mode defines the target screen area and a display manner of the target screen area in the bright screen state. The target screen area is a display zone associated with the hole-regions in the display area.

Figure 2:
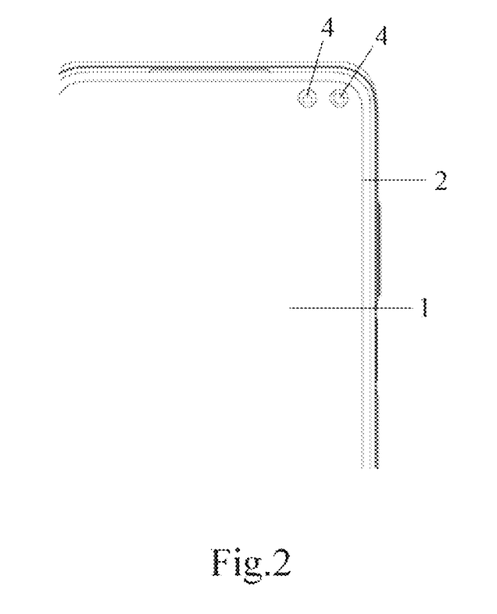
FIG. 2 is a schematic diagram showing a terminal display interface according to an embodiment.

The display mode may include a full-screen display mode. The full-screen display mode defines entire punch-hole screen to display in a full-screen display manner, such as display a background picture in a full screen, display a browsing webpage in a full screen, and so on. For example, FIG. 2 is a schematic diagram showing a terminal display interface according to an embodiment. There are two hole-regions in the punch-hole screen shown in FIG. 2, and the two hole-regions 4 are close to a first display area edge 2. The full-screen display mode defines entire punch-hole screen 1 to perform a full-screen display.

The display mode may include a black-screen display mode. The black-screen display mode defines a black-screen display manner, and specifically defines a display zone associated with hole-regions to display in a black-screen display manner.

When at least two hole-regions are provided in the punch-hole screen, the at least two hole-regions may be arranged horizontally or vertically. Under this structure, the black-screen display mode may include a runway display mode. The runway display mode defines a bar-shaped target screen area surrounding the at least two hole-regions to display in the black-screen display manner.

Figure 3:
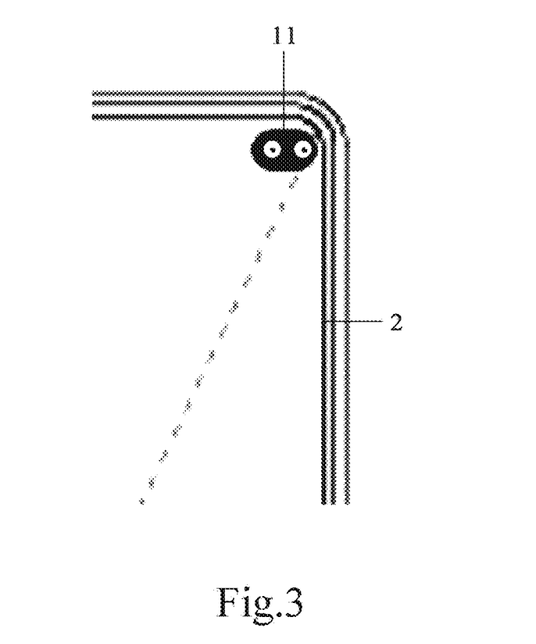
FIG. 3 is a schematic diagram showing another terminal display interface according to an embodiment.
Figure 4:
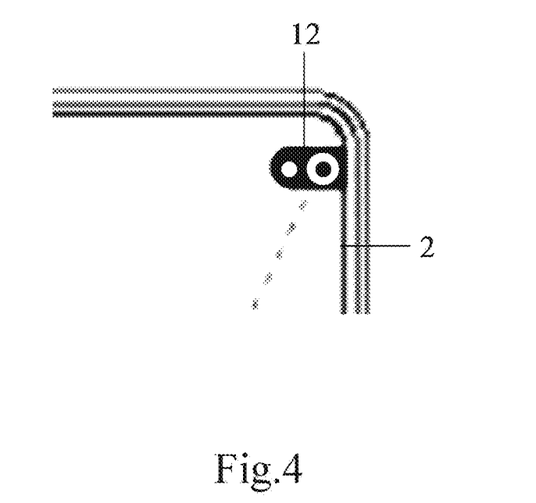
FIG. 4 is a schematic diagram showing another terminal display interface according to an embodiment.
Figure 5:
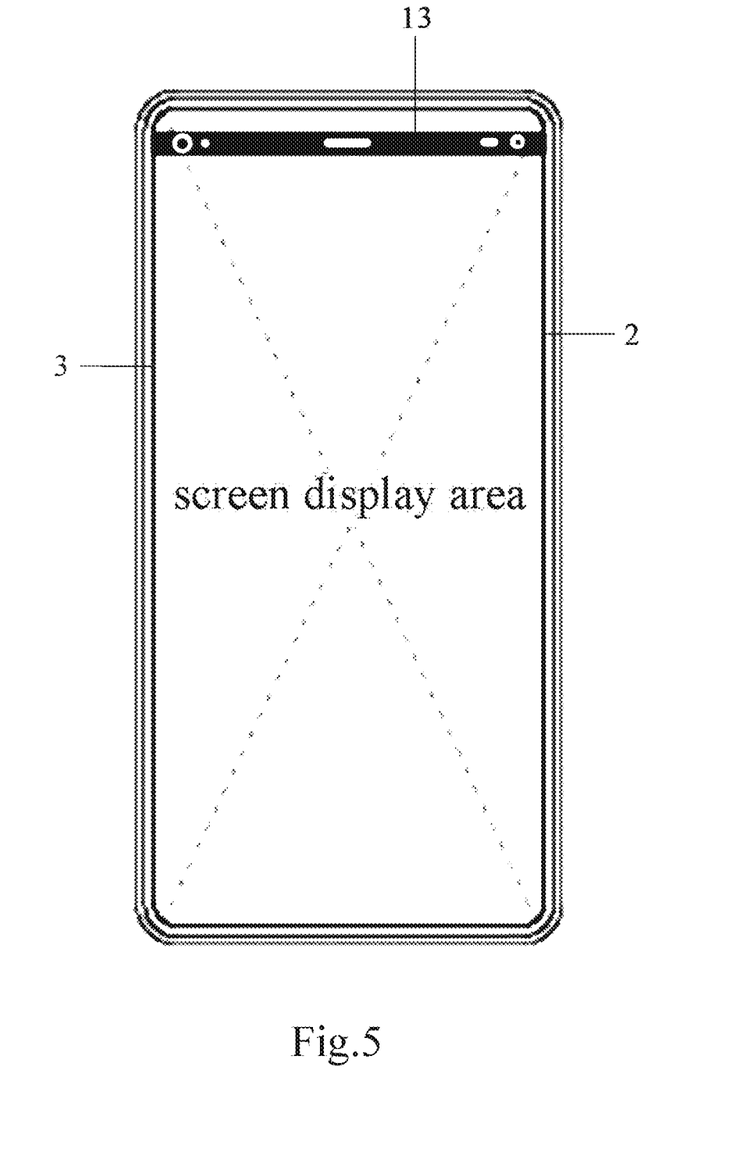
FIG. 5 is a schematic diagram showing another terminal display interface according to an embodiment.

For example, FIG. 3 is a schematic diagram showing a terminal display interface according to an embodiment, FIG. 4 is a schematic diagram showing another terminal display interface according to an embodiment, and FIG. 5 is a schematic diagram showing another terminal display interface according to an embodiment. In FIGS. 3-5, the display area of the terminal includes a first display area edge 2 and a second display area edge 3, which are opposite to each other. The first display area edge 2 and the second display area edge 3 are edges parallel to a terminal height direction. Two hole-regions 4 are disposed near the first display area edge 2. For example, the distance between the hole-regions 4 and the upper portion of the first display area edge 2 is less than 5 mm.

The runway display mode may include a first runway display mode. Referring to FIG. 3, the first runway display mode defines that the bar-shaped target screen area 11 is spaced apart from the first display area edge 2 and the second display area edge 3, respectively.

In real life, the first runway display mode may only define the bar-shaped target screen area 11, or the first runway display mode may define both the bar-shaped target screen area 11 and the bar-shaped target screen area 11'(not shown) simultaneously, and the bar-shaped target screen area 11 and the bar-shaped target screen area 11' are symmetrically set along the central axis of the display area. The central axis of the display area may be parallel to the first display area edge 2 or perpendicular to the first display area edge 2.

The runway display mode may include a second runway display mode. Referring to FIG. 4, the second runway display mode defines that the bar-shaped target screen area 12 extends to the first display area edge 2 and is spaced apart from the second display area edge 3.

The runway display mode may include a third runway display mode. Referring to FIG. 5, the third runway display mode defines that the bar-shaped target screen area 13 extends to the first display area edge 2 and the second display area edge 3, respectively. The bar-shaped target screen area 13 runs through entire display area.

In addition to the above-mentioned lateral arrangement, two adjacent hole-regions 4 may also be longitudinally arranged in a direction parallel to the terminal height direction. In addition to adjacent arrangement, two holes can also be disposed on both sides of the display area respectively, that is, one hole is close to the first display area edge 2 and the other hole is close to the second display area edge 3. Two hole-regions 4 may be set symmetrically or asymmetrically.

There are many ways for the terminal to determine the display mode of the punch-hole screen.

When the display mode switching instruction is generated based on a display mode switching operation performed by the user on the system setting interface, the terminal may determine the display mode according to the display mode switching operation. For example, the system setting interface of the terminal provides a plurality of mode options, such as the above-mentioned full-screen display mode option, the first runway display mode option, the second runway display mode option, and the third runway display mode option. The terminal determines corresponding display mode according to the option selected by the user.

When the display mode switching instruction is generated based on a screen sliding operation of the user, a display mode corresponding to currently received screen sliding operation is determined based on a pre-established corresponding relation between the screen sliding operation and the display mode.

For example, a first corresponding relation between a swipe-up screen operation and a full-screen display manner and a second corresponding relation between a swipe-down screen operation and a black-screen display manner are established, and then the terminal determines a full-screen display manner after detecting the swipe-up screen operation.

In step 103, the target screen area defined by the display mode is controlled to display in the defined display manner.

After the terminal determines the display mode of the punch-hole screen, the target screen area defined by the display mode is controlled to display according to the display manner defined by the display mode.

For example, when the display mode is the full-screen display mode described above, the terminal controls the entire punch-hole screen to display in a full-screen display manner; when the display mode is the black-screen display mode described above, the terminal controls the target screen area to display in a black-screen display manner. The terminal can realize a black-screen display of the target screen area by controlling the pixel value of the pixel unit in the target screen area.

The embodiment of the present disclosure can realize the display control of the display area associated with the hole-regions in the bright screen state by acquiring a display mode switching instruction, determining a display mode of the punch-hole screen based on the display mode switching instruction, and controlling a target screen area defined by the display mode to display according to the display manner determined by the display mode, thereby enriching the display functions of the terminal and improving the user experience.

In an embodiment, at least two hole-regions on the punch-hole screen are arranged horizontally or vertically. The black-screen display mode includes a runway display mode. The runway display mode defines a bar-shaped target screen area surrounding at least two hole-regions.

Figure 6:
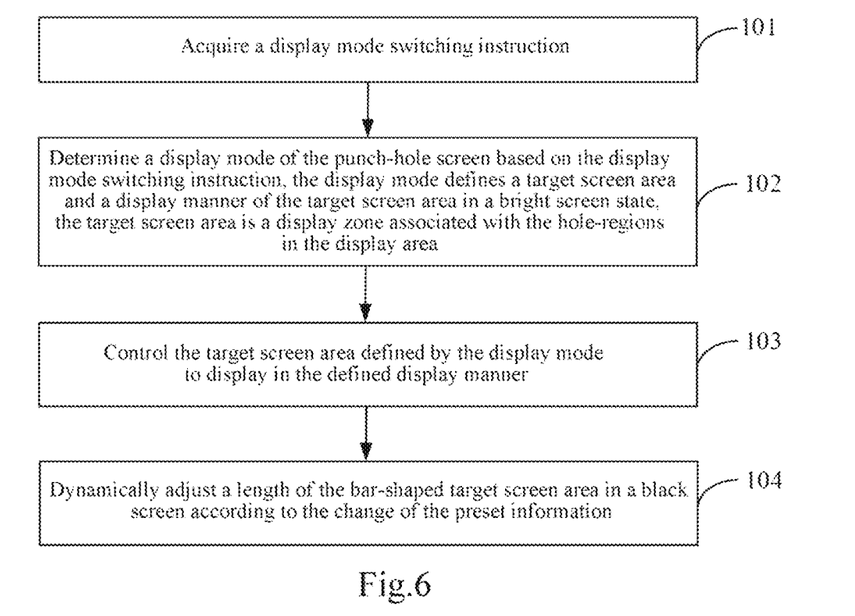
FIG. 6 is a flow chart showing another punch-hole screen display method according to an embodiment.

FIG. 6 is a flow chart showing another punch-hole screen display method according to an embodiment. Referring to FIG. 6, when the terminal uses the runway display mode, the method may further include the following steps. In step 104, a length of the bar-shaped target screen area in a black screen is dynamically adjusted according to the change of the preset information. There are various types of preset information. For example, the preset information may include any one of the following: remaining power of the terminal, a time length between a current time and a target time.

The bar-shaped target screen area in the black screen is used for information showing, and the length of the bar-shaped target screen area in the black screen can reflect information value of the preset information.

When the preset information includes remaining power of the terminal, the length of the bar-shaped target screen area in the black screen can reflect the amount of remaining power. The user can know the remaining battery power of the terminal battery by checking the length of the bar-shaped target screen area in the black screen.

The bar-shaped target screen area in the black screen and the alarm clock program can be used in combination, and the length of the bar-shaped target screen area in the black screen is used to reflect a waiting time length for the alarm to start. The user can determine the time length from the current moment until the start moment of the alarm clock by checking the length of the bar-shaped target screen area in a black-screen.

In the embodiment of the present disclosure, the bar-shaped target screen area in a black-screen is used for information showing. The user can know the information condition of the preset information according to the length of the bar-shaped target screen area in a black-screen used to show information, thereby improving the user experience while enriching the terminal functions.

Figure 7:
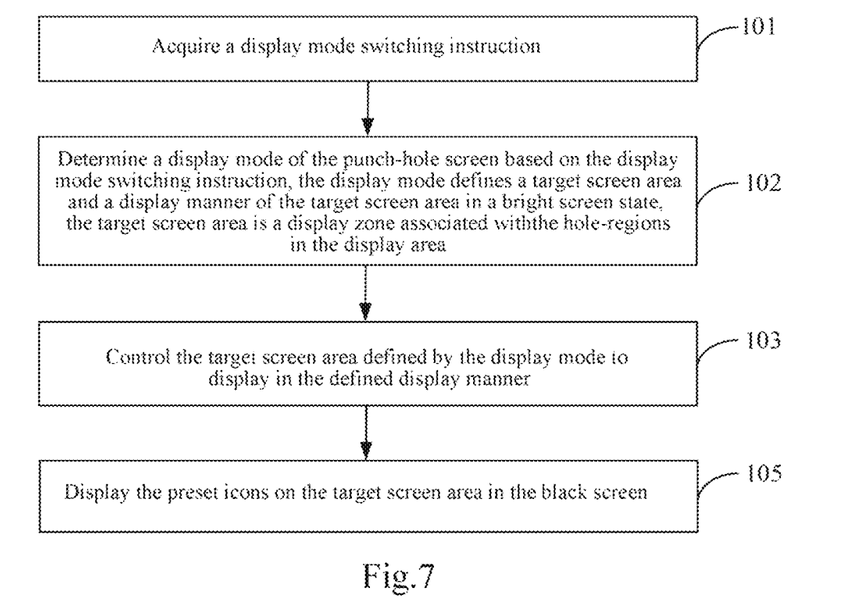
FIG. 7 is a flow chart showing another punch-hole screen display method according to an embodiment.

FIG. 7 is a flow chart showing another punch-hole screen display method according to an embodiment. Referring to FIG. 7, in an embodiment, when the display mode of the punch-hole screen is a black-screen display mode, the method may further include the following step. In step 105, one or more preset icons are displayed on the target screen area in the black screen.

For example, when the display mode is the third runway display mode, the bar-shaped target screen area in the black screen runs through entire screen, and one or more preset icons are displayed on the bar-shaped target screen area.

There are various kinds of preset icons. For example, the preset icons may include at least one of the following: theme element icons, application icons, and custom icons. The embodiment of the present disclosure does not limit the type of the preset icons.

The preset icons can be an icon set by the system or an icon set by the user. For example, the user can set alarm clock program icon, address book program icon, chat software icon and so on into the bar-shaped target screen area in the black screen according to his own usage habits, and click the icon in the bar-shaped target screen area to directly enter the application interface, which is easy to find and use the application.

The embodiment of the present disclosure uses a black-screen area associated with hole-regions to display a preset image, which improves the utilization ratio of the display area of the terminal and enriches the display manner of the terminal.

Based on the setting of the above steps, the user can control the terminal to switch the display mode by swiping the screen or entering a voice message, which has the advantages of convenient operation and fast switching speed. The user can also set the display mode in the system setting interface to complete the display mode switch.

For the foregoing method embodiments, for simplicity of description, they are all described as a series of action combinations, but those skilled in the art should know that the present disclosure is not limited by the described order of actions, because according to the present disclosure, some steps can be performed in another order or simultaneously.

Secondly, those skilled in the art should also know that the embodiments described in the specification are all embodiments, and the actions and modules involved are not necessarily required by the present disclosure.

Corresponding to the foregoing application function implementation method embodiments, the present disclosure also provides embodiments of an application function implementation device and a corresponding terminal.

Figure 8:
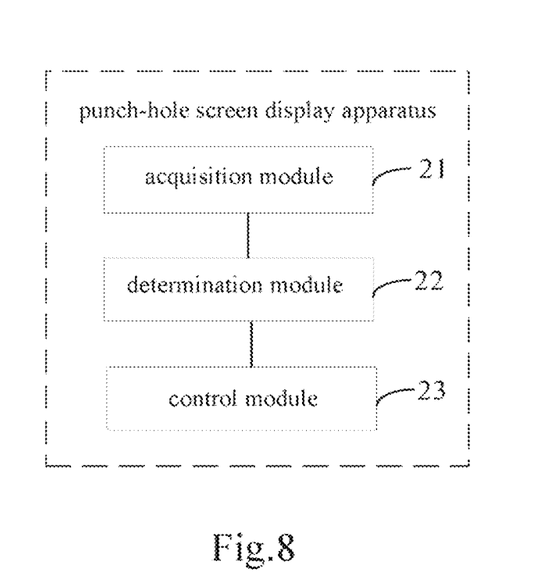
FIG. 8 is a block diagram of a punch-hole screen display apparatus according to an embodiment.

FIG. 8 is a block diagram of a punch-hole screen display apparatus according to an embodiment. The punch-hole screen includes a display area and at least two hole-regions provided in the display area for light to enter. The apparatus includes an acquisition module 21, a determination module 22, and a control module 23.

The acquisition module 21 is configured to acquire a display mode switching instruction.

The determination module 22 is configured to determine a display mode of the punch-hole screen based on the display mode switching instruction, and the display mode defines a target screen area and a display manner of the target screen area in a bright screen state. The target screen area is a display zone associated with the hole-regions in the display area.

The control module 23 is configured to control the target screen area to display in the display manner defined by the display mode.

In an embodiment, on the basis of the punch-hole screen display apparatus shown in FIG. 8, the display mode includes a full-screen display mode, and the full-screen display mode defines entire punch-hole screen and a full-screen display manner.

The control module 23 may be configured to control the entire punch-hole screen to display in a full-screen display manner.

In an embodiment, on the basis of the punch-hole screen display apparatus shown in FIG. 8, the display mode includes a black-screen display mode, and the black-screen display mode defines a black-screen display manner;

The control module 23 may be configured to control the target screen area to display in a black-screen display manner.

In an embodiment, on the basis of the punch-hole screen display apparatus shown in FIG. 8, the at least two hole-regions are arranged horizontally or vertically; the black-screen display mode includes a runway display mode, and the runway display mode defines a bar-shaped target screen area surrounding the at least two hole-regions.

The control module 23 may be configured to control the bar-shaped target screen area to display in a black-screen display manner.

In an embodiment, on the basis of the punch-hole screen display apparatus shown in FIG. 8, the display area of the terminal includes a first display area edge and a second display area edge, which are opposite to each other, and the at least two holes are disposed near the first display area edge.

The runway display mode may include a first runway display mode, the first runway display mode defines that the bar-shaped target screen area is spaced apart from the first display area edge and the second display area edge, respectively.

The runway display mode may include a second runway display mode, the second runway display mode defines that the bar-shaped target screen area extends to the first display area edge and is spaced apart from the second display area edge.

The runway display mode may include a third runway display mode, the third runway display mode defines that the bar-shaped target screen area extends to the first display area edge and the second display area edge, respectively.

Figure 9:
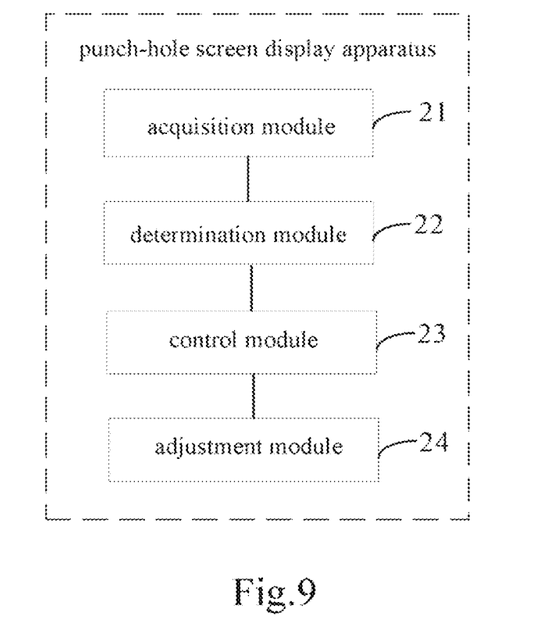
FIG. 9 is a block diagram of another punch-hole screen display apparatus according to an embodiment.

In an embodiment, referring to FIG. 9, on the basis of the punch-hole screen display apparatus shown in FIG. 8, the apparatus may further include an adjustment module 24.

The adjustment module 24 is configured to dynamically adjust the length of the bar-shaped target screen area in the black screen according to changes in preset information, and the preset information includes any one of the following: remaining battery power of the terminal, a time length between a current moment and a target moment.

Figure 10:
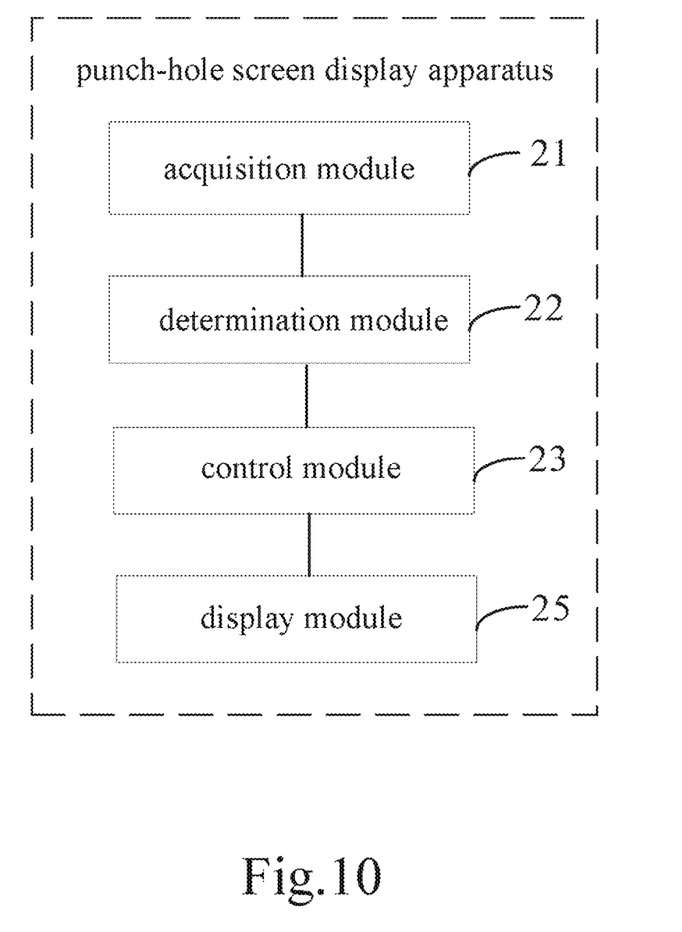
FIG. 10 is a block diagram of another punch-hole screen display apparatus according to an embodiment.

Referring to FIG. 10, in an embodiment, on the basis of the hole-screen display apparatus shown in FIG. 8, the apparatus may further include a display module 25.

The display module 25 is configured to display one or more preset icons on the target screen area in the black screen, and the preset icons include at least one of the following: theme element icons, application icons, and custom icons.

In an embodiment, on the basis of the hole-screen display apparatus shown in FIG. 8, the acquisition module 21 may include a first generation sub-module, a second generation sub-module, and a third generation sub-module.

The first generation sub-module is configured to generate the display mode switching instruction based on a display mode switching operation performed by a user on a system setting interface; or the second generation sub-module is configured to generate the display mode switching instruction based on a screen sliding operation of the user; or the third generation sub-module is configured to generate the display mode switching instruction based on a voice message input by the user.

As for the device embodiment, since it basically corresponds to the method embodiment, the relevant part may refer to the description of the method embodiment. The device embodiments described above are only schematic, in which the units described as separate components may or may not be physically separated, and the components shown as units may or may not be physical units, that is, may be located in one place, or can be distributed across multiple network elements. Some or all of the modules can be selected according to actual needs to achieve the objectives of the solution of the present disclosure. Those of ordinary skill in the art can understand and implement without creative efforts.

Correspondingly, in one aspect, an embodiment of the present disclosure provides a punch-hole screen display device, including: a processor; a memory for storing executable instructions of the processor; wherein the processor is configured to:

acquire a display mode switching instruction;

determine a display mode of the punch-hole screen based on the display mode switching instruction, the display mode defining a target screen area and a display manner of the target screen area in a bright screen state, and the target screen area is a display zone associated with the hole-regions in the display area; and control the target screen area to display in the display manner.

Figure 11:
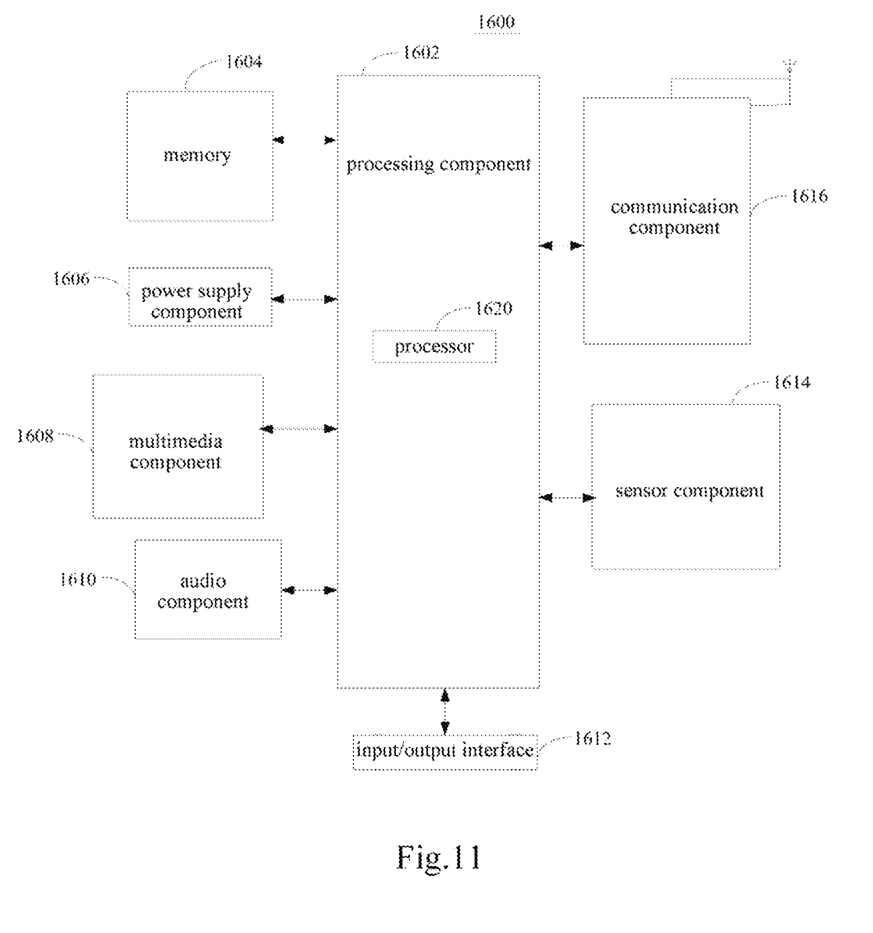
FIG. 11 is a structural schematic diagram showing a punch-hole screen display device according to an embodiment.

FIG. 11 is a schematic structural diagram showing a punch-hole screen display device 1600 according to an embodiment. For example, the device 1600 may be a user equipment, which may specifically be a mobile phone, a computer, a digital broadcasting terminal, a messaging transceiver, a game console, a tablet device, a medical device, a fitness device, a personal digital assistant, a wearable device, such as a smart watch, a smart glasses, smart bracelets, smart running shoes, etc.

Referring to FIG. 11, the device 1600 may include one or more of the following components: a processing component 1602, a memory 1604, a power supply component 1606, a multimedia component 1608, an audio component 1610, an input/output (I/O) interface 1612, a sensor component 1614, and communication component 1616.

The processing component 1602 generally controls the overall operation of the device 1600, such as operations associated with display, telephone calls, data communications, camera operations, and recording operations. The processing component 1602 may include one or more processors 1620 to execute instructions, so as to complete all or part of the steps of the method described above. In addition, the processing component 1602 may include one or more modules to facilitate the interaction between the processing component 1602 and other components. For example, the processing component 1602 may include a multimedia module to facilitate the interaction between the multimedia component 1608 and the processing component 1602.

The memory 1604 is configured to store various types of data to support operation at the device 1600. Examples of such data include instructions for any application or method operating on the device 1600, contact person data, phone book data, messages, pictures, videos, and the like. The memory 1604 can be implemented by any type of volatile or non-volatile storage devices or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk.

The power supply component 1606 provides power to various components of the device 1600. The power supply component 1606 may include a power supply management system, one or more power sources, and other components associated with generating, managing, and distributing power for the device 1600.

The multimedia component 1608 includes a screen providing an output interface between the above-mentioned device 1600 and a user. In some embodiments, the screen may include a liquid crystal display (LCD) and a touch panel (TP). If the screen includes a touch panel, the screen may be implemented as a touch screen to receive an input signal from a user. The touch panel includes one or more touch sensors to sense touch, swipe, and gestures on the touch panel. The above-mentioned touch sensor can not only sense the boundary of a touch action or a sliding action, but also detect the duration and pressure related to the above-mentioned touch operation or sliding operation. In some embodiments, the multimedia component 1608 includes a front camera and/or a rear camera. When the device 1600 is in an operation mode, such as a shooting mode or a video mode, the front camera and/or the rear camera can receive external multimedia data. Each of the front camera and the rear camera can be a fixed optical lens system or have focal length and optical zoom capabilities.

The audio component 1610 is configured to output and/or input audio signals. For example, the audio component 1610 includes a microphone (MIC), that is configured to receive an external audio signal when the device 1600 is in an operation mode such as a call mode, a recording mode, and a voice recognition mode. The received audio signal may be further stored in the memory 1604 or transmitted via the communication component 1616. In some embodiments, the audio component 1610 further includes a speaker for outputting audio signals.

The I/O interface 1612 provides an interface between the processing component 1602 and a peripheral interface module. The peripheral interface module mentioned above may be a keyboard, a click wheel, a button, or the like. These buttons may include, but are not limited to: a home button, a volume button, a start button, and a lock button.

The sensor assembly 1614 includes one or more sensors for providing a status assessment of the various aspects to the device 1600. For example, the sensor assembly 1614 can detect the on/off state of the device 1600 and the relative positioning of the components. For example, the components mentioned above are the display and keypad of the device 1600. The sensor assembly 1614 can also detect the change in the position of the device 1600 or a component of the device 1600, the presence or absence of the user's contact with the device 1600, the orientation or acceleration/deceleration of the device 1600, and the temperature change of the device 1600. The sensor assembly 1614 may include a proximity sensor configured to detect the presence of nearby objects without any physical contact. The sensor assembly 1614 may also include a light sensor, such as a CMOS or CCD image sensor, for use in imaging applications. In some embodiments, the sensor assembly 1614 may further include an acceleration sensor, a gyroscope sensor, a magnetic sensor, a pressure sensor, or a temperature sensor.

The communication component 1616 is configured to facilitate wired or wireless communication between the device 1600 and other devices. The device 1600 can access a wireless network based on a communication standard, such as WiFi, 2G, or 3G, or a combination thereof. In one embodiment, the communication component 1616 receives a broadcast signal or broadcast-related information from an external broadcast management system via a broadcast channel. In an embodiment, the above-mentioned communication component 1616 further includes a near field communication (NFC) module to facilitate short-range communication. For example, the NFC module can be implemented based on radio frequency identification (RFID) technology, infrared data association (IrDA) technology, ultra-wideband (UWB) technology, Bluetooth (BT) technology and other technologies.

In an embodiment, the device 1600 may be implemented by one or more application-specific integrated circuits (ASICs), digital signal processors (DSPs), digital signal processing devices (DSPDs), programmable logic devices (PLDs), field programmable gate array (FPGA), controller, microcontroller, microprocessor, or other electronic component implementation, which are used to perform the above method.

In an embodiment, a non-transitory computer-readable storage medium is also provided, such as a memory 1604 including instructions. When the instructions in the storage medium are executed by the processor 1620 of the device 1600, the device 1600 can perform a punch-hole screen display method, which includes:

acquiring a display mode switching instruction;

determining a display mode of the punch-hole screen based on the display mode switching instruction, the display mode defining a target screen area and a display manner of the target screen area in a bright screen state, and the target screen area is a display zone associated with the hole-regions in the display area; and controlling the target screen area to display in the display manner.

The non-transitory computer-readable storage medium may be a ROM, a random access memory (RAM), a CD-ROM, a magnetic tape, a floppy disk, an optical data storage device, and the like.

Figure 12:
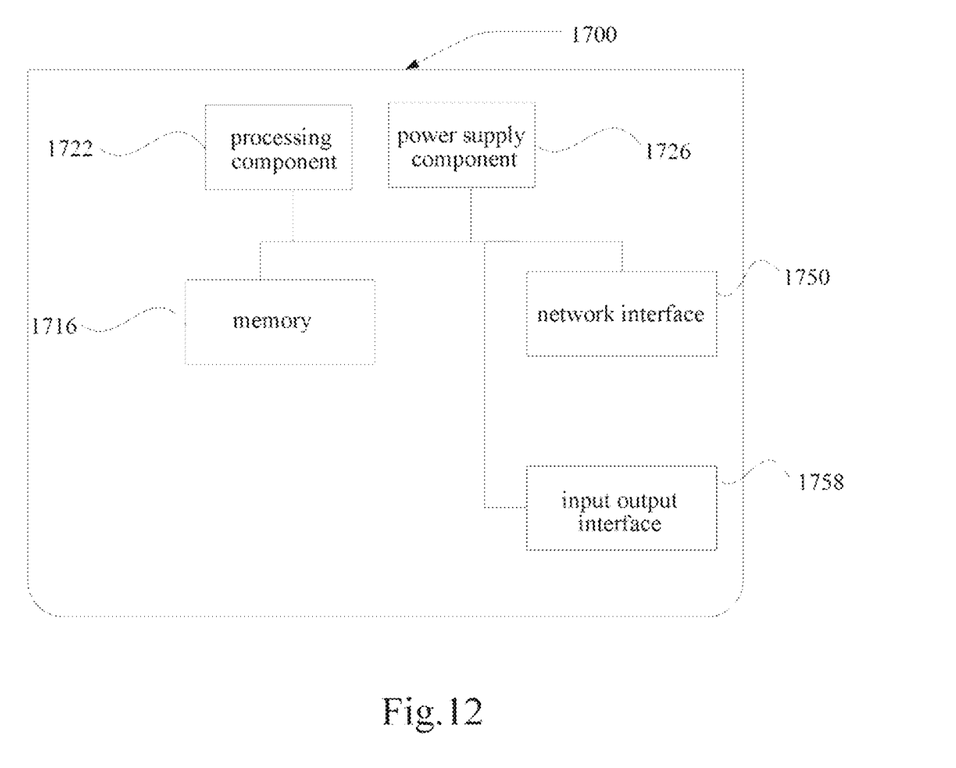
FIG. 12 is a structural schematic diagram showing another punch-hole screen display device according to an embodiment.

As shown in FIG. 12, FIG. 12 is a schematic structural diagram showing another punch-hole screen display device 1700 according to an embodiment. For example, the device 1700 may be provided as an application server. Referring to 12, the device 1700 includes a processing component 1722, which further includes one or more processors, and a memory resource represented by a memory 1716, which are used to store instructions executable by the processing component 1722, such as an application program. The application program stored in the memory 1716 may include one or more modules, each of these modules corresponds to a set of instructions. In addition, the processing component 1722 is configured to execute an instruction to execute the punch-hole screen display method mentioned above.

The device 1700 may further include a power supply component 1726, configured to perform power supply management of the device 1700; a wired or wireless network interface 1750, configured to connect the device 1700 to a network; and an input/output (I/O) interface 1758. The device 1700 can operate based on an operating system stored in the memory 1716, such as Android, iOS, Windows Server™, Mac OS X™, Unix™, Linux™, FreeBSD™, or the like.

In an embodiment, a non-transitory computer-readable storage medium including instructions may be provided, such as a memory 1716 including instructions, the instructions may be executed by the processing component 1722 of the device 1700 to complete the above method. For example, the non-transitory computer-readable storage medium may be a ROM, a random access memory (RAM), a CD-ROM, a magnetic tape, a floppy disk, an optical data storage device, and the like.

Wherein, when the instructions in the memory 1716 are executed by the processing component 1722, the device 1700 can execute a punch-hole screen display method, which includes:

acquiring a display mode switching instruction;

determining a display mode of the punch-hole screen based on the display mode switching instruction, the display mode defining a target screen area and a display manner of the target screen area in a bright screen state, and the target screen area is a display zone associated with the hole-regions in the display area; and controlling the target screen area to display in the display manner.

In one or more embodiment, the display mode includes a full-screen display mode, and the full-screen display mode defines entire punch-hole screen and a full-screen display manner; controlling the target screen area to display in the display manner includes controlling the entire punch-hole screen to display in the full-screen display manner. In one or more embodiment, the display mode includes a black-screen display mode, and the black-screen display mode defines a black-screen display manner; controlling the target screen area to display in the display manner includes controlling the target screen area to display in the black-screen display manner. In one or more embodiment, the at least two hole-regions are arranged horizontally or vertically; the black-screen display mode includes a runway display mode, and the runway display mode defines a bar-shaped target screen area surrounding the at least two hole-regions; controlling the target screen area to display in the black-screen display manner includes controlling the bar-shaped target screen area to display in the black-screen display manner.

In one or more embodiment, the display area of a terminal includes a first display area edge and a second display area edge, which are opposite to each other, and the at least two hole-regions are disposed near the first display area edge; the runway display mode includes a first runway display mode, and the first runway display mode defines that the bar-shaped target screen area is spaced apart from the first display area edge and the second display area edge respectively; or the runway display mode includes a second runway display mode, and the second runway display mode defines that the bar-shaped target screen area extends to the first display area edge and is spaced apart from the second display area edge; or the runway display mode includes a third runway display mode, and the third runway display mode defines that the bar-shaped target screen area extends to the first display area edge and the second display area edge, respectively.

In one or more embodiment, the method further includes dynamically adjusting the length of the bar-shaped target screen area in a black screen according to changes in preset information, the preset information includes any one of the following: remaining power of the terminal, and a time length between a current moment and a target moment. In one or more embodiment, the method further includes displaying one or more preset icons on the target screen area in the black screen, the one or more preset icons include at least one of the following: theme element icons, application icons, and custom icons.

In one or more embodiment, acquiring a display mode switching instruction includes: generating the display mode switching instruction based on a display mode switching operation performed by a user on a system setting interface; or generating the display mode switching instruction based on the user's screen sliding operation; or generating the display mode switching instruction based on a voice message input by the user.

In one or more embodiment, the display mode includes a full-screen display mode, and the full-screen display mode defines entire punch-hole screen and a full-screen display manner; the control module is configured to control the entire punch-hole screen to display in a full-screen display manner. In one or more embodiment, the display mode includes a black-screen display mode, and the black-screen display mode defines a black-screen display manner; the control module is configured to control the target screen area to display in a black-screen display manner. In one or more embodiment, the at least two hole-regions are arranged horizontally or vertically; the black-screen display mode includes a runway display mode, and the runway display mode defines a bar-shaped target screen area surrounding the at least two hole-regions; the control module is configured to control the bar-shaped target screen area to display in the black-screen display manner.

In one or more embodiment, the display area of a terminal includes a first display area edge and a second display area edge, which are opposite to each other, and the at least two hole-regions are disposed near the first display area edge; the runway display mode includes a first runway display mode, and the first runway display mode defines that the bar-shaped target screen area is spaced apart from the first display area edge and the second display area edge, respectively; or the runway display mode includes a second runway display mode, and the second runway display mode defines that the bar-shaped target screen area extends to the first display area edge and is spaced apart from the second display area edge; or the runway display mode includes a third runway display mode, and the third runway display mode defines that the bar-shaped target screen area extends to the first display area edge and the second display area edge, respectively.

In one or more embodiment, the apparatus further includes an adjustment module configured to dynamically adjust the length of the bar-shaped target screen area in a black screen according to changes in preset information, the preset information includes any of the following: remaining power of the terminal and a time length between a current moment and a target moment. In one or more embodiment, the apparatus further includes a display module configured to display one or more preset icons on the target screen area in the black screen, the one or more preset icons include at least one of the following: theme element icons, application icons, and custom icons.

In one or more embodiment, the acquisition module includes a first generation sub-module, configured to generate the display mode switching instruction based on a display mode switching operation performed by a user on a system setting interface; or a second generation sub-module, configured to generate the display mode switching instruction based on a screen sliding operation of the user; or a third generation sub-module, configured to generate the display mode switching instruction based on a voice message input by the user.

The technical solutions provided by the embodiments of the present disclosure may include the following beneficial effects. In the present disclosure, the display control of the display area associated with the hole-regions in the bright screen state is achieved by determining a display mode of a punch-hole screen based on a display mode switching instruction, and controlling a target screen area defined by the display mode to display in a defined display manner.

Those skilled in the art will readily contemplate other embodiments of the present disclosure after considering the specification and practicing the invention disclosed herein. This disclosure is intended to cover any variations, uses, or adaptations of this disclosure that follow the general principles of this disclosure and include the common general knowledge or conventional technical means in the technical field not disclosed by this disclosure. It is intended that the specification and examples be considered as exemplary only, with a true scope and spirit of the disclosure being indicated by the following claims.

It should be understood that the present disclosure is not limited to the precise structure that has been described above and illustrated in the accompanying drawings, and various modifications and changes may be made without departing from the scope thereof. The scope of the disclosure is limited only by the following claims.

What is claimed is:

1. A punch-hole screen display method, comprising:
    acquiring, by a terminal, a display mode switching instruction, wherein the terminal comprises a punch-hole screen having a display area and at least two hole-regions disposed in the display area for light to enter;
    determining, by the terminal, a display mode of the punch-hole screen based on the display mode switching instruction, wherein the display mode defines a target screen area and a display manner of the target screen area in a bright screen state, and the target screen area is a display zone associated with the at least two hole-regions in the display area, wherein the target screen area reflects information value of preset information and a length of the target screen area is dynamically adjusted according to changes in the preset information; and
    displaying, by the terminal, the target screen area in the display manner.

2. The method according to claim 1, wherein the display mode comprises a full-screen display mode, and the full-screen display mode defines entire punch-hole screen and a full-screen display manner; and
    displaying, by the terminal, the target screen area in the display manner comprises displaying, by the terminal, the entire punch-hole screen in the full-screen display manner.

3. The method according to claim 1, wherein the display mode comprises a black-screen display mode, and the black-screen display mode defines a black-screen display manner; and
    displaying, by the terminal, the target screen area in the display manner comprises displaying, by the terminal, the target screen area in the black-screen display manner.

4. The method according to claim 3, wherein the at least two hole-regions are arranged horizontally or vertically; the black-screen display mode includes a runway display mode, and the runway display mode defines a bar-shaped target screen area surrounding the at least two hole-regions; and
    displaying, by the terminal, the target screen area in the black-screen display manner comprises displaying, by the terminal, the bar-shaped target screen area in the black-screen display manner.

5. The method according to claim 4, wherein the display area of the terminal includes a first display area edge and a second display area edge that are opposite to each other, and the at least two hole-regions are disposed near the first display area edge; and the runway display mode comprises one of the following:
    the runway display mode comprises a first runway display mode, the first runway display mode defines that the bar-shaped target screen area is spaced apart from the first display area edge and the second display area edge respectively;
    the runway display mode comprises a second runway display mode, the second runway display mode defines that the bar-shaped target screen area extends to the first display area edge and is spaced apart from the second display area edge; and
    the runway display mode comprises a third runway display mode, the third runway display mode defines that the bar-shaped target screen area extends to the first display area edge and the second display area edge, respectively.

6. The method according to claim 4, further comprises:
    dynamically adjusting, by the terminal, the length of the bar-shaped target screen area in a black screen according to changes of preset information, the preset information comprising one of the following: remaining power of the terminal and a time length between a current moment and a target moment.

7. The method according to claim 3, further comprises:
    displaying one or more preset icons on the target screen area in a black screen, the one or more preset icons comprising at least one of the following: theme element icons, application icons, and custom icons.

8. The method according to claim 1, wherein acquiring, by the terminal, the display mode switching instruction comprises one of the following:
    generating, by the terminal, the display mode switching instruction based on a display mode switching operation performed by a user on a system setting interface;
    generating, by the terminal, the display mode switching instruction based on the user's screen sliding operation; and
    generating, by the terminal, the display mode switching instruction based on a voice message input by the user.

9. A terminal for displaying a punch-hole screen, comprising:
    one or more processors; and
    a non-transitory storage coupled to the one or more processors; and a plurality of programs stored in the non-transitory storage that, when executed by the one or more processors, cause the terminal to:
acquire a display mode switching instruction, wherein the terminal comprises a punch-hole screen having a display area and at least two hole-regions disposed in the display area for light to enter;
determine a display mode of the punch-hole screen based on the display mode switching instruction, wherein the display mode and defines a target screen area and a display manner of the target screen area in a bright screen state, and the target screen area is a display zone associated with the at least two hole-regions in the display area, wherein the target screen area reflects information value of preset information and a length of the target screen area is dynamically adjusted according to changes in the preset information; and
display the target screen area in the display manner.

10. The terminal according to claim 9, wherein the display mode comprises a full-screen display mode, and the full-screen display mode defines entire punch-hole screen and a full-screen display manner; and
the plurality of programs cause the terminal further to display the entire punch-hole screen in the full-screen display manner.

11. The terminal according to claim 9, wherein the display mode comprises a black-screen display mode, and the black-screen display mode defines a black-screen display manner; and
the plurality of programs cause the terminal further to display the target screen area in the black-screen display manner.

12. The terminal according to claim 11, wherein the at least two hole-regions are arranged horizontally or vertically; the black-screen display mode includes a runway display mode, and the runway display mode defines a bar-shaped target screen area surrounding the at least two hole-regions; and
the plurality of programs cause the terminal further to display the bar-shaped target screen area in the black-screen display manner.

13. The terminal according to claim 12, wherein the display area of the terminal includes a first display area edge and a second display area edge that are opposite to each other, and the at least two hole-regions are disposed near the first display area edge; and the runway display mode comprises one of the following:
the runway display mode comprises a first runway display mode, the first runway display mode defines that the bar-shaped target screen area is spaced apart from the first display area edge and the second display area edge respectively;
the runway display mode comprises a second runway display mode, the second runway display mode defines that the bar-shaped target screen area extends to the first display area edge and is spaced apart from the second display area edge; and
the runway display mode comprises a third runway display mode, the third runway display mode defines that the bar-shaped target screen area extends to the first display area edge and the second display area edge, respectively.

14. The terminal according to claim 12, wherein the plurality of programs cause the terminal to dynamically adjust the length of the bar-shaped target screen area in a black screen according to changes of preset information, the preset information comprising one of the following: remaining power of the terminal, and a time length between a current moment and a target moment.

15. The terminal according to claim 11, wherein the plurality of programs cause the terminal to display one or more preset icons on the target screen area in a black screen, the one or more preset icons comprising at least one of the following: theme element icons, application icons, and custom icons.

16. The terminal according to claim 9, wherein the plurality of programs cause the terminal further to perform acts comprising one of the following:
generating the display mode switching instruction based on a display mode switching operation performed by a user on a system setting interface;
generating the display mode switching instruction based on the user's screen sliding operation; and
generating the display mode switching instruction based on a voice message input by the user.

17. A non-transitory computer readable storage medium storing a plurality of programs for execution by a terminal having one or more processors, wherein the plurality of programs, when executed by the one or more processors, cause the terminal to perform acts comprising:
acquiring a display mode switching instruction, wherein the terminal comprises a punch-hole screen having a display area and at least two hole-regions disposed in the display area for light to enter;
determining a display mode of the punch-hole screen based on the display mode switching instruction, wherein the display mode defines a target screen area and a display manner of the target screen area in a bright screen state, and the target screen area is a display zone associated with the at least two hole-regions in the display area, wherein the target screen area reflects information value of preset information and a length of the target screen area is dynamically adjusted according to changes in the preset information; and
displaying the target screen area in the display manner.

18. The non-transitory computer readable storage medium according to claim 17, wherein the display mode comprises a full-screen display mode, and the full-screen display mode defines entire punch-hole screen and a full-screen display manner; and
displaying the target screen area in the display manner comprises displaying the entire punch-hole screen in the full-screen display manner.

19. The non-transitory computer readable storage medium according to claim 17, wherein the display mode comprises a black-screen display mode, and the black-screen display mode defines a black-screen display manner; and
displaying the target screen area in the display manner comprises displaying the target screen area in the black-screen display manner.

20. The non-transitory computer readable storage medium according to claim 19, wherein the at least two hole-regions are arranged horizontally or vertically; the black-screen display mode includes a runway display mode, and the runway display mode defines a bar-shaped target screen area surrounding the at least two hole-regions; and
displaying, the target screen area in the black-screen display manner comprises displaying the bar-shaped target screen area in the black-screen display manner.

* * * * *